United States Patent [19]

Koizumi et al.

[11] Patent Number: 4,782,412
[45] Date of Patent: Nov. 1, 1988

[54] AZIMUTHALLY ADJUSTABLE MEANS FOR ATTACHING MAGNETIC HEADS

[75] Inventors: Satoru Koizumi; Daisuke Teshima; Yoshio Katayama, all of HigashiHiroshima, Japan

[73] Assignee: Sharp Kabushiki Kaisha, Osaka, Japan

[21] Appl. No.: 85,307

[22] Filed: Aug. 10, 1987

Related U.S. Application Data

[63] Continuation of Ser. No. 827,786, Feb. 6, 1986, abandoned.

[30] Foreign Application Priority Data

Feb. 8, 1985 [JP] Japan .............................. 60-17567[U]

[51] Int. Cl.⁴ .................................................. G11B 5/56
[52] U.S. Cl. ..................................................... 360/109
[58] Field of Search .................................. 360/104–105, 360/109

[56] References Cited

U.S. PATENT DOCUMENTS 3,821,814  6/1974  Gordon et al. ................ 360/109 X Primary Examiner—John H. Wolff
Attorney, Agent, or Firm—Fehr, Hohbach, Test, Albritton & Herbert

[57] ABSTRACT

Individual magnetic heads for cassette tapes in compartments which are stacked one on top of another are attached to separate supporting pieces of different heights and secured in a slidable plate at different horizontal distances from the cassette compartments. Prior art mechanisms for azimuthally adjustable attachment can be effectively used to secure the magnetic heads on the supporting pieces.

5 Claims, 1 Drawing Sheet

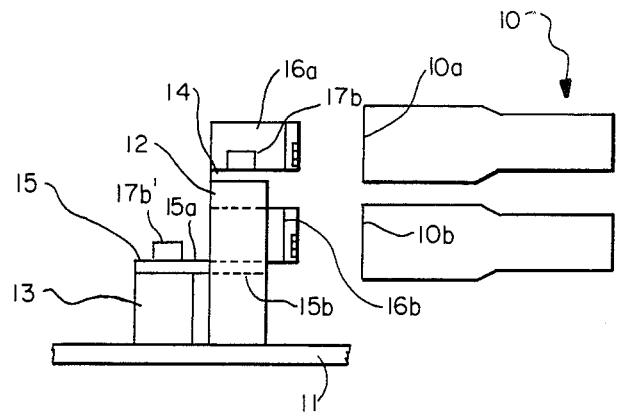
FIG.—1
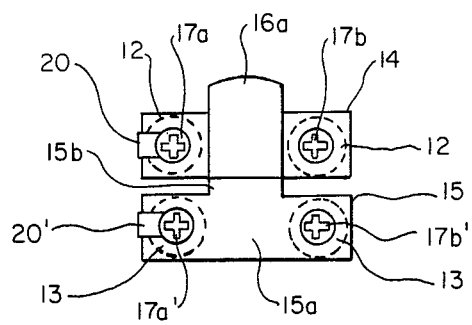
FIG.—2
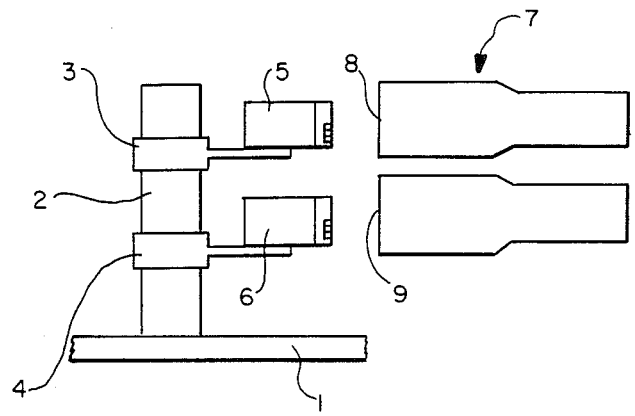
PRIOR ART
FIG.—3

AZIMUTHALLY ADJUSTABLE MEANS FOR ATTACHING MAGNETIC HEADS

This is a continuation of application Ser. No. 827,796, filed 2/6/86, now abandoned.

This invention relates to a means for attaching magnetic heads to a tape recorder of the type having a capstan and a reel axis disposed coaxially and a plurality of tape cassettes one on top of another such that the magnetic heads are in face-to-face relationships with the tape cassettes.

There have been tape recorders with a capstan and a reel axis disposed coaxially so that a plurality of tape cassettes stacked one on top of another can be played consecutively or simultaneously for the purpose of long-time playing and/or dubbing. Reference being made to FIG. 3 which shows a conventional means for attaching magnetic heads in such a tape recorder, two magnetic heads 5 and 6 are secured through attachment plates 3 and 4, respectively, to a supporting shaft 2 on a slidable plate 1 such that these magnetic heads 5 and 6 can be positioned in face-to-face relationships with tape cassette compartments 8 and 9 in a cassette compartment section 7. With a conventional attachment device of this type, however, it is not possible to adjust the heads azimuthally.

It is therefore an object of the present invention in view of the above to provide a means for attaching magnetic heads with which the azimuthal adjustments of the individual heads can be effected easily and independently.

It is another object of the present invention to provide a tape recorder comprising such a device for attaching magnetic heads.

Other objects and further scope of applicability of the present invention will become apparent from the detailed description given hereunder. It should be understood, however, that the detailed description and specific examples of this invention, while indicating preferred embodiments of the invention, are given by way of illustration only, since various changes and modifications within the spirit and scope of the invention will become apparent to those skilled in the art from this detailed description.

The objects of the present invention are attained by providing a new means for attaching magnetic heads. In addition to a cassette compartment section in which tape cassettes are mounted one on top of another and a plurality of magnetic heads corresponding thereto, a plurality of supporting shafts are provided with heights corresponding to those of the cassettes to secure the magnetic heads thereon. These shafts are erected sequentially along a line directed away from the cassettes and the magnetic heads are secured in such manners that their azimuthal adjustments can be effected easily and independently.

The present invention will become more fully understood from the detailed description given hereinbelow and the accompanying drawings which are given by way of illustration only and thus are not limitative of the present invention and wherein:

FIG. 1 is a side view of a section of a means according to the present invention for attaching magnetic heads, FIG. 2 is a plan view of the means of FIG. 1, and FIG. 3 is a side view of a section of a conventional means for attaching magnetic heads.

In FIGS. 1 and 2 which illustrate a means according to the present invention for attaching magnetic heads, numeral 10 indicates a cassette compartment section with two cassette compartments 10a and 10b disposed one on top of the other. Numeral 11 indicates a slidable plate on which are two supporting shafts 12 and 13 of different heights corresponding to the cassette compartments 10a and 10b, respectively, the lower shaft 13 being farther away from the cassette compartment section 10. Numerals 14 and 15 indicate each an attachment plate. One of them (14) has an approximately rectangular external shape and a magnetic head 16a is secured nearly at the center thereon. Two end sections of this magnetic head 16a are fastened to the upper surface of the supporting shaft 12 by two screw means 17a and 17b. The other attachment plate 15 has a rectangular base part 15a and a protruding part 15b extending horizontally from the base part 15a towards the cassette compartment section 10, being T-shaped as a whole. Another magnetic head 16b (not shown in FIG. 2) is secured to the upper surface of this protruding part 15b. It is intended that the magnetic heads 16a and 16b are designed according to the Standards of Electronic Industries Association of Japan related to dimensions of magnetic head for cassette tape recorders (established May 1973). The attachment plate 15 is secured with two screw means 17a' and 17b' at its two ends to the upper surface of the supporting shaft 13 which is lower than the other supporting shaft 12. In summary, the two magnetic heads 16a and 16b are set on the attachment plates 14 and 15 at different heights corresponding to the cassette inlets 10a and 10b.

The attachment plates 14 and 15 are each provided with a cut-out part 20 and 20' at one end thereof (according to the aforementioned Standard) such that the screw means 17a and 17a' at these ends may be rotated to adjust the magnetic heads 16a or 16b azimuthally with the aid of a spring means (not shown) by any of the known mechanisms disclosed, for example, in Japanese Utility Publication (Kokoku) 48-6658 published Feb. 20, 1973 or Japanese Utility Publication (Kokoku) 49-5684 published Feb. 9, 1974. Such a known mechanism will be referred to in the claims section below as means for independently effecting azimuthal adjustments. The slidable plate 11 advances forward when a button is pressed so as to cause the magnetic heads 16a and 16b to come into contact with the tapes in the cassette compartment section 10. With the pressing of another button, it moves backwards and separates the magnetic heads 16a and 16b from the tapes in the cassette compartment section 10.

With the means for attaching the magnetic heads structured as described above, azimuthal adjustments of the magnetic heads 16a and 16b disposed separately at different heights can be effected easily and independently by rotating the screw means 17a and 17a' with a screwdriver or the like. This, consequently, has the effect of improving the tape recorder containing this means as a whole regarding both serviceability at the time of a repair and workability of its assembly.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, not only can the azimuthal adjustments of the magnetic heads be effected but also the heights of the heads can be changed by rotating the screw means with which the heads are secured. Although an embodiment with two cassettes and two magnetic heads were shown for the description of the present invention, three or more cassettes and as many magnetic heads may be included. It is intended that the scope of the invention be defined by the claims appended hereto.

What is claimed is:

1. Means for attaching magnetic heads to a cassette tape recorder comprising a cassette compartment section with two cassette compartments one on top of the other for mounting tape cassettes individually at different heights, two magnetic heads at said different heights, each adapted to engage with one of cassettes mounted in said cassette compartments, individually separate means for supporting said magnetic heads, a slidable plate with said individual supporting means secured separately thereon at different horizontal distances from said cassette compartment section, and means for independently effecting azimuthal adjustments of said magnetic heads.

2. The attaching means of claim 1 wherein said magnetic heads are disposed on said supporting means at different heights, individually opposite to and corresponding to the heights of said two cassette compartments.

3. The attaching means of claim 1 wherein said magnetic heads are secured to said supporting means by screw means.

4. The attaching means of claim 3 wherein said screw means serve to adjust said magnetic heads azimuthally.

5. The attaching means of claim 1 wherein sad magnetic heads are designed accoding to the Standards of Electronic Industries Association of Japan.

* * * * *